United States Patent
Zhang et al.

(10) Patent No.: US 10,809,126 B2
(45) Date of Patent: Oct. 20, 2020

(54) IMAGE BASED HANDHELD IMAGER SYSTEM AND METHODS OF USE

(71) Applicant: PhotoniCare, Inc., Champaign, IL (US)

(72) Inventors: Anqi Zhang, Champaign, IL (US); Wei Kang, Urbana, IL (US); Ryan Nolan, Urbana, IL (US); Ryan Shelton, Champaign, IL (US)

(73) Assignee: PhotoniCare, Inc., Champaign, IL (US)

( * ) Notice: Subject to any disclaimer, the term of this patent is extended or adjusted under 35 U.S.C. 154(b) by 0 days.

(21) Appl. No.: 16/542,736

(22) Filed: Aug. 16, 2019

(65) Prior Publication Data
US 2019/0368929 A1 Dec. 5, 2019

Related U.S. Application Data (63) Continuation-in-part of application No. PCT/US2018/019951, filed on Feb. 27, 2018.
(60) Provisional application No. 62/464,711, filed on Feb. 28, 2017.

(51) Int. Cl.
*G01J 3/28* (2006.01)
*G01J 3/02* (2006.01)

(52) U.S. Cl.
CPC ........... *G01J 3/0297* (2013.01); *G01J 3/0218* (2013.01); *G01J 3/0272* (2013.01); *G01J 3/0275* (2013.01); *G01J 3/0291* (2013.01)

(58) Field of Classification Search
CPC ...... G01J 3/0297; G01J 3/0291; G01J 3/0275; G01J 3/0272; G01J 3/0218; G01J 3/0208; G01J 3/18; G01J 3/45; G01B 9/02091; G01B 9/02044
See application file for complete search history.

(56) References Cited

U.S. PATENT DOCUMENTS

| | | | |
|---|---|---|---|
| 6,122,538 A | 9/2000 | Sliwa, Jr. et al. | 600/407 |
| 8,115,934 B2 | 2/2012 | Boppart et al. | 356/479 |
| 8,594,757 B2 | 11/2013 | Boppart et al. | 600/310 |
| 9,638,511 B2 | 5/2017 | Boppart et al. | G01B 9/02091 |
| 9,867,528 B1 | 1/2018 | Boppart et al. | A61B 1/2275 |
| 10,278,570 B2 | 5/2019 | Nolan et al. | A61B 1/2275 |
| 2009/0103088 A1* | 4/2009 | Delmas | G02B 27/0025 356/328 |
| 2012/0050746 A1 | 3/2012 | Sharma et al. | 356/479 |
| 2013/0044313 A1* | 2/2013 | Rolland | G01J 3/0208 356/51 |
| 2013/0208240 A1 | 8/2013 | Sharma et al. | A61B 3/102 |

(Continued)

FOREIGN PATENT DOCUMENTS

| WO | WO2018/129430 | 7/1918 | ............. A61B 1/227 |
|---|---|---|---|
| WO | WO2018/160561 | 9/1918 | ................ G01J 3/45 |
| WO | WO2010/007025 | 1/2010 | ............. G01N 21/47 |

OTHER PUBLICATIONS

International Search Report and Written Opinion issued in corresponding foreign application, PCT/US2018/019951, pp. 1-7 (dated Jun. 21, 2018).

(Continued)

*Primary Examiner* — Abdullahi Nur
(74) *Attorney, Agent, or Firm* — J. Peter Paredes; Rosenbaum IP, P.C.

(57) ABSTRACT

An Image based handheld imager system is disclosed utilizing consumer-grade 2D camera arrays, while also addressing the problems of image quality, sensitivity, and imaging depth.

19 Claims, 4 Drawing Sheets

(56) References Cited

U.S. PATENT DOCUMENTS

2015/0268097 A1 9/2015 Ishimaru .................. G01J 3/02
2016/0040978 A1 2/2016 Boppart et al. .... G01B 9/02091

OTHER PUBLICATIONS

International Preliminary Report on Patentability issued in corresponding foreign application, PCT/US2018/019951, pp. 1-6 (dated Sep. 12, 2019).
Pande, P. et al, "A Mosaicking Approach for In Vivo Thickness Mapping of the Human Tympanic Membrane Using Low Coherence Interferometry," J Assoc Res Otolaryngol. 17(5), 403-416, 2016.
Nguyen, C T et al, "Noninvasive in vivo optical detection of biofilm in the human middle ear," *Proc Natl Acad Sci* 109(24), 9529-34, 2012.

\* cited by examiner

IMAGE BASED HANDHELD IMAGER SYSTEM AND METHODS OF USE

CROSS-REFERENCE TO RELATED APPLICATIONS

The present application is a continuation in part and claims priority to PCT application serial no. PCT/US2018/019951, filed Feb. 27, 2018, which claims priority to U.S. provisional application Ser. No. 62/464,711, filed Feb. 28, 2017, each herein incorporated by reference in their entireties.

BACKGROUND

The invention generally relates to imaging and more specifically to imaging devices.

In otoscopic imaging, a handheld imager is commonly employed in clinical settings. The current gold standard, the otoscope is based on a magnifying lens which provides a large depth of focus. As such, it is less subject to the movement of handheld imager for clinicians to see through the lens. Since the advent of OCT, technology has been improved from traditional otoscope to the recently reported handheld OCT imagers as disclosed in U.S. Pat. No. 8,115,934 and US publication no. 2016/0040978. However since OCT provides a depth resolved image at micrometer resolution with certain imaging range, the involuntary movement of handheld probe will not only change the depth of imaging target on the OCT results but might also result in no OCT results if the movement is larger than the OCT imaging range. In order to be used as easily as the traditional otoscope, the movement of an OCT imager in a handheld setting has to be taken into account, such that a long OCT imaging depth is preferred for easy tracking the current depth of target of interest. Even though some SS-OCT systems can achieve larger than 1 cm imaging depth, the current cost of such system prevents the adoption of a SS-OCT based system in primary care office. In U.S. Pat. No. 8,115,934, the handheld imager is based on SD-OCT configuration using a line scan camera. While it provides elegant OCT images, the use of line scan camera and corresponding frame grabber together with the alignment requirement also greatly increase the system cost. The imaging depth of such system is around 4 mm. Longer imaging depth can be achieved using a spectrometer with higher spectral resolution, which significantly increases the cost.

In US publication no. 2016/0040978, a handheld imager using an area scan camera was proposed. The main advantage of this imager is the low cost compared to the one reported in U.S. Pat. No. 8,115,934. In this configuration, the interferometric signal is directly projected onto the area sensor and demodulated afterwards to form the useful information. However one of the drawbacks is the imaging depth. With an 8 megapixel sensor the imaging depth is less than 1 mm. For a consumer grade area scan camera it is very challenging to reach several millimeters imaging depth. Furthermore due to the fact that each pixel only contributes to the signal around its location controlled by the point spread function, the sensitivity of such configuration compared with SD-OCT is compromised. The fact that all the optics and area scan camera must be contained in the handheld imager means that the dimension of the handheld imager is also greatly increased compared to U.S. Pat. No. 8,115,934. This fact together with long integration time (>100 us) leads to more severe fringe washout than SD-OCT system.

For OCT otoscopic imaging targeted for primary care use, based on SD-OCT configuration, one more realistic approach is to use a consumer-grade camera which has common connectors such as USB or Ethernet. Such configuration can be easily integrated with a laptop or tablet which leads to a portable system. The cost of such system becomes reasonable for it to be used in the primary care office. Besides, considering of its usability, the system should provide sufficient performance with adequate imaging depth.

The present invention attempts to solve these problems as well as others.

SUMMARY OF THE INVENTION

Provided herein are systems, methods and apparatuses for an Image based handheld imager system utilizing a 2D sensor with sensor arrays, while also addressing the problems of image quality, sensitivity, and imaging depth.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. The words proximal and distal are applied herein to denote specific ends of components of the instrument described herein. A proximal end refers to the end of an instrument nearer to an operator of the instrument when the instrument is being used. A distal end refers to the end of a component further from the operator and extending towards the surgical area of a patient and/or the implant.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any non-claimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the in the related art.

The term "camera," as used herein, shall refer to a device adapted to image a scene onto a sensor and to convert an optical image into an electrical signal. The sensor is a component of the "camera," as a matter of definition, for purposes of the present description and any appended claims. Camera may also be referred to herein as a photodetector, although it is to be understood that camera may additionally include other optical components such as one or more lenses within the scope of the present invention.

The term "OCT" or "Optical Coherence Tomography" means any type of process which uses low-coherence interferometry (LCI) and includes LCI, TD-OCT, SD-OCT, SS-OCT, and any other of the vast number of other OCT modalities. SS-OCT can be achieved through capturing each k component from the swept-source as one camera image/frame.

The term "low-coherence" (or "broadband," as used interchangeably herein) applies to a source of illumination for which the coherence length is shorter than 30 and/or for which $\Delta k/k_0$ is at least 10%, with $k_0$ denoting the central wavenumber of the spectrum illuminating the sample, while $\Delta k$ denotes the range of illuminating wavenumbers. It is to be understood that, within the scope of the present invention, the wavelength of the source need not be fixed in time, indeed, the wavelength of the source may be swept in time.

Image Based Handheld Imager System

Generally speaking, an Image based handheld imager system is disclosed using an area scan camera with novel improvements that enable a clinically-relevant solution. The Image based handheld imager system includes a relaxed alignment requirement without compromising image quality. Description will be made with reference to an OCT based system for the Image based handheld imager system for exemplary purposes only. Since the spectrometers in traditional SD-OCT systems have extremely high machining tolerances due to the tight alignment requirements, the Image based handheld imager system addresses this fundamental constraint of a traditional SD-OCT system. The Image based handheld imager system includes a plurality of algorithms to facilitate intelligent representation of low coherence interferometry (LCI) data. The plurality of algorithms includes an effectively doubling of the imaging depth by utilizing the complex conjugate ambiguity in FD-OCT, and improving the interpretation of LCI data.

Relaxed Alignment Requirement without Compromising Image Quality.

Figure 1:
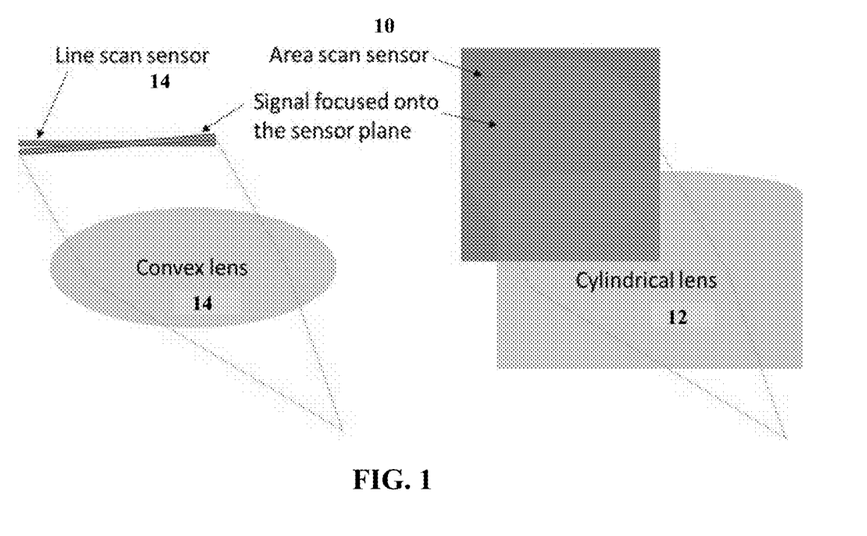
FIG. 1 is a schematic diagram displaying alignment error that causes signal loss in use of a line scan sensor while signal is still captured in use of an area scan sensor.

In a typical SD-OCT system, the use of line scan camera imposes a high tolerance in the alignment for detection. Since the line sensor is generally tens of micrometers in height, all the light must be focused along the line sensor within this dimension. Such high tolerance greatly increases the cost of SD-OCT system. To reduce the tolerance for alignment and thereby reduce cost, the Image based handheld imager system comprises a two-step approach. First, an area scan camera 10 together with a cylindrical lens 12 are used to replace a line scan camera 14 and convex lens 16, as shown in FIG. 1. Like a traditional SD-OCT system, the signal collimated by a collimator is dispersed through a grating. Different from a traditional SD-OCT system, the cylindrical lens focuses the signal onto the area scan sensor. If misalignment occurs, for example the grating diffraction plane tilts with respect to the camera sensor; the signal is still captured due to the nature of plane detection of the area sensor. FIG. 1 illustrates one example that in the case of line scan sensor, where part of the signals are not captured due to tilt whereas in the case of area scan sensor, all the signals are captured by the sensor. As a result, the alignment tolerance compared with line scan sensor is greatly alleviated.

Figure 2:
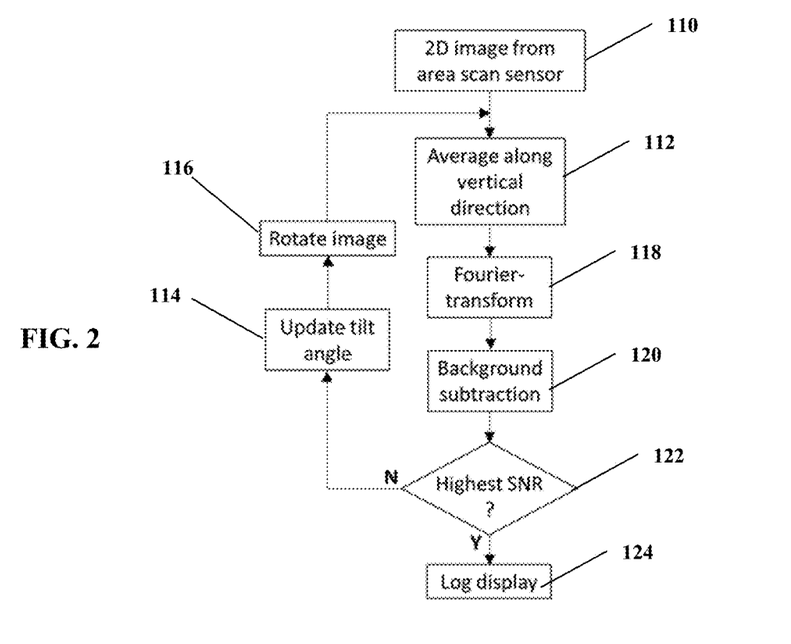
FIG. 2 is a schematic flow chart showing the image processing procedures to correct rotation error in alignment.

Secondly, the Image based handheld imager system includes a specific signal processing scheme to further mitigate the effect of misalignment. The signal processing scheme and associated algorithms are operable by a computer readable storage medium connected to a computer with a processor, which runs a software program or module to effectuate the signal processing scheme and associated algorithms. By using an area scan sensor, after image is acquired, an average can be performed along the direction of same wavelength component. Such average operation greatly reduces the detector noise and increases the system's sensitivity and also provides a degree of freedom to correct the rotational angle due to misalignment as illustrated in FIG. 1. FIG. 2 illustrates the image processing procedures. In practice, a phantom for example a mirror may be placed in the sample arm at an appropriate depth such that the periodic fringe patterns can be clearly observed. If LCI is not used, known reference spectrum may be clearly observed rather than the periodic fringe pattern. In one embodiment, the phantom is needed only once to find the tilt angle, but not needed in compensating the tilt angle. In one embodiment, the phantom is not needed during the use of the spectrometer but only needed in the alignment phase. A 2D image is acquired from the area scan sensor in step 110, the tilt angle due to alignment error regarding the average direction is identified and corrected in step 112. The Image based handheld imager system may employ an algorithm detects the tilt angle in step 114 and rotate the whole image according to this angle in step 116. The algorithm is based on the fact that if there is no tilt angle, the fringes orient perpendicular to the direction of average and hence no fringe washout occurs during averaging. If LCI is not used, known reference spectrum may be oriented perpendicular to the direction of average and hence no known reference spectrum washout occurs during averaging. The LCI signal after Fourier-transform in step 118 will be the largest compared to the case of fringe washout. A background subtraction step 120 is performed and a highest Signal-to-Noise (SNR) is obtained at step 122. If the highest SNR is not obtained, then the updated tilted angle step 114 and rotate image step 116 is performed again and then step 112 average along the vertical direction. If the highest SNR is obtained, a log display step 124 is performed. Thus a maximum value search algorithm is developed to find the tilt angle. The detection of tilt angle is not necessary each time when the system is used. The detection of the tilt angle is only performed during the alignment process, and will be part of a calibration. This software correction can be equivalently achieved through changing the direction of average operation to the tilt angle while not rotating the image.

Figure 3:
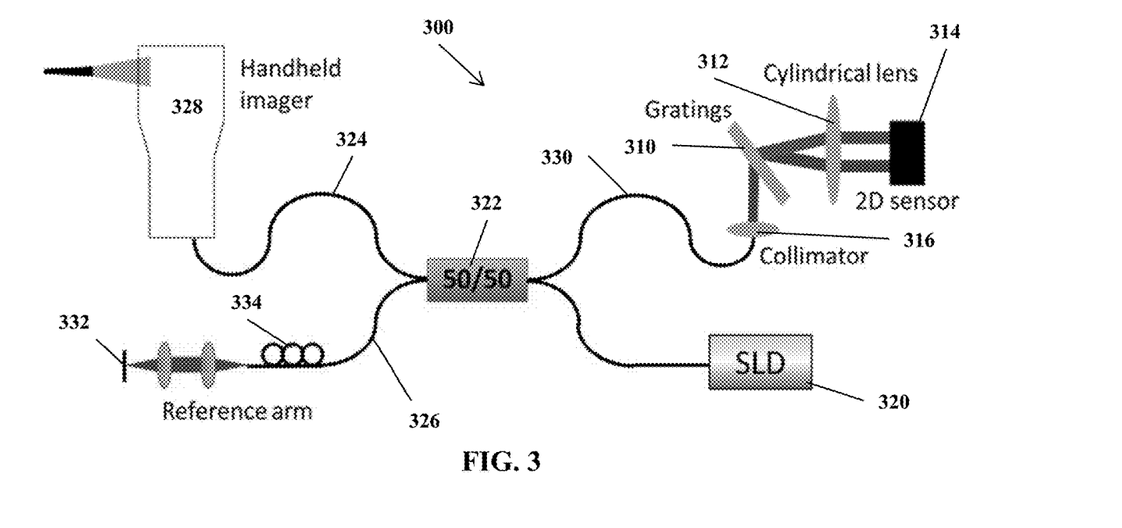
FIG. 3 is a schematic showing the configuration of the system.

According to one embodiment, FIG. 3 illustrates one configuration of the SD-OCT system 300. Light derived from a low-coherence source 320, such as a superluminescent diode (SLD), for example, is split by beam splitter 322 into a sample beam into a sample arm 324 and a reference beam into a reference arm 326 of the interferometer. The sample beam in the sample arm 324 is focused by focal optics in a handheld imager 328 onto sample, while reference beam is directed toward a free space reference arm 326 with a mirror 332 for reflecting light back into the interferometer. In one embodiment, the handheld imager 328 may include focusing lens and mirror. In one embodiment, the reference arm 326 may include polarization paddle 334. Light scattered by the sample is directed toward a detection arm 330 into a collimator 316, a grating 310, a cylindrical lens 312 and a sensor 314.

While less tolerance of alignment can be achieved using area scan camera and proposed image process method, the performance of SD-OCT system should not be compromised in order to provide meaningful clinical data. In one embodiment, the sensor 314 is a consumer grade area scan camera using the Sony Pregius IMX249 sensor is employed. In other embodiments, the sensor is a photodetector array is a two-dimensional array of detector elements, and is typically a CCD or CMOS, although any two-dimensional detector array is within the scope of the present invention. In one embodiment, the OCT handheld imager system reaches >100 dB sensitivity at about 500 µm depth, <1.65 dB roll off over 1 mm imaging depth and >7 mm imaging depth. FIG. 3 illustrates the configuration of the SD-OCT system 300, according to one embodiment. The theoretical imaging depth of SD-OCT is directly determined by the sampling resolution of k component or wavelength in the interferometric signal, which also affects the roll-off parameter. In order to reach sufficient wavelength sampling, an 1800 l/mm @ 840 nm grating 310 is used, according to one embodiment. If the FWHM is larger, a grating with a smaller l/mm can be used, where the choice of l/mm is also determined by the focal-length of the cylindrical lens and the 2D sensor size. Together with a 100 mm focal length cylindrical lens 312, 35 nm spectral bandwidth signal is dispersed and collimated into a 10 mm width beam, and then captured by a 2D sensor 314. In one embodiment, the use of Sony Pregius IMX249 sensor which has about 5.86 µm pixel size leads to >7 mm imaging depth. Alternative imaging depths may be employed with alternative sensors. To achieve better roll off characteristics, a 60 mm focal length lens 316 is used to collimate the signal emitting from the interferometer. The spot size is calculated to be about 8.15 µm at the area sensor, which reduces the cross talk at detection. The SD-OCT system achieved >7 mm imaging depth and about a 1.6 dB roll off over about a 1 mm range using $20 \log_{10}$ convention. To better provide the stability in the handheld setting, the optics in the handheld imager provides about a 1 mm confocal parameter probing beam to ensure a stable beam profile around the focus. Due to the fact that area scan sensor is used, the raw data for each A-line signal is a 2D image. If LCI is not used, then A-line signal is a signal of spectrum and may be a 1D image. After the 2D image is acquired, the signal is processed according to FIG. 2 to generate one A-line result. If LCI is not used, then after the 1D image is acquired, the signal is processed according to FIG. 2 to generate 1D spectrum result. The detection arm of the interferometer may comprise a spectrometer that may be incorporated into other imaging detection systems, such as not to be limited to LCI data.

Compared with U.S. Pat. No. 8,115,934, the alignment requirement is relaxed with greatly reduced cost and the interferometer can be easily integrated with a laptop or tablet, while the image quality is not compromised. Compared with US publication no. 2016/0040978, this system has higher sensitivity where speed is not compromised, shorter integration time leading to less subjectivity due to imager/human subject movement, more compact handheld design owing to the fact that there is no need to put the 2D sensor in the handheld imager, and less requirement for sensor pixel number in order to achieve a long imaging depth. These performance parameters make such a system a better suited candidate for use in primary care clinical settings.

Figure 4A:
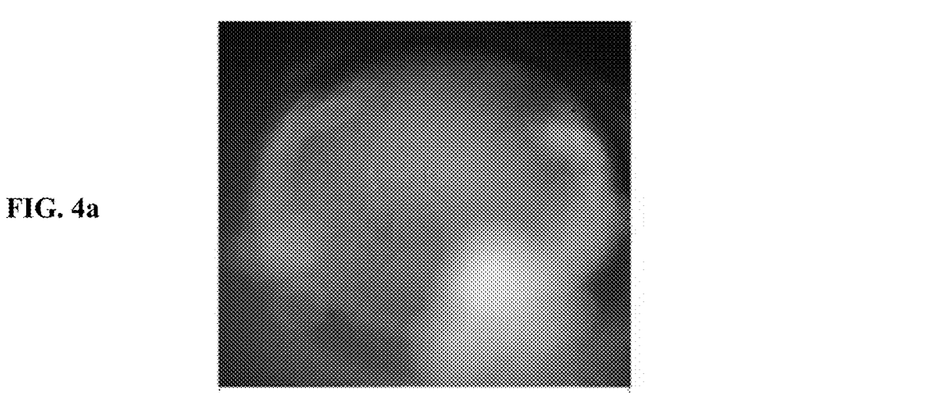
FIG. 4A is an OCT image of an in-vivo result of a human subject.
Figure 4B:
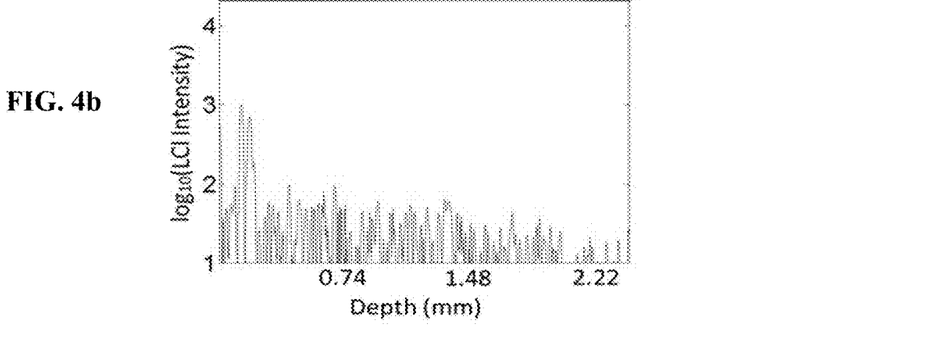
FIG. 4B is a graph of the depth resolved data acquired by the OCT image of in-vivo results of a human subject.

FIG. 4 illustrates an in-vivo LCI scanning result using the proposed system upon a healthy human subject. This result clearly indicates the thickness of tympanic membrane (TM) and demonstrates proposed utility in the clinical settings. The TM thickness at the imaging site is obtained by computing the distance between the two peaks in the LCI data, which correspond to the two layers of the TM, namely, the epidermal (outside) and the mucosal (inside) layer. In one embodiment, the TM thickness at each imaging site was estimated as the average thickness obtained from a sequence of 100 depth resolved profiles, or A-lines, which were acquired at the speed of camera's frame rate. In one embodiment, the frame rate is between about Tens of Hz to about 2 kHz.

Computer Readable Algorithms to Facilitate Intelligent Representation of Low Coherence Interferometry (LCI) Data.

In clinical settings, compared with traditional OCT image, the acquired single A-line profile after image processing will be less intuitive to interpret due to less information. If targeted for primary care, there is a need to provide better comprehensible results to clinicians. Further, unlike 2D OCT, a complex conjugate ambiguity in LCI might be hard to differentiate. "Complex conjugate ambiguity" results in an overlapped image where the image from negative frequencies is mirrored into the positive frequencies, which is normally avoided in OCT. With the current otoscopy in the handheld setting, given the movement of the handheld probe and sometimes the imaging subject, this ambiguity might also be more likely to happen. In other embodiments, any movement of a probe or subject may result in this ambiguity. To solve these problems, the Image based handheld imager system comprises a two-step approach to interpret the A-line data for clinical use, according to one embodiment.

Figure 5:
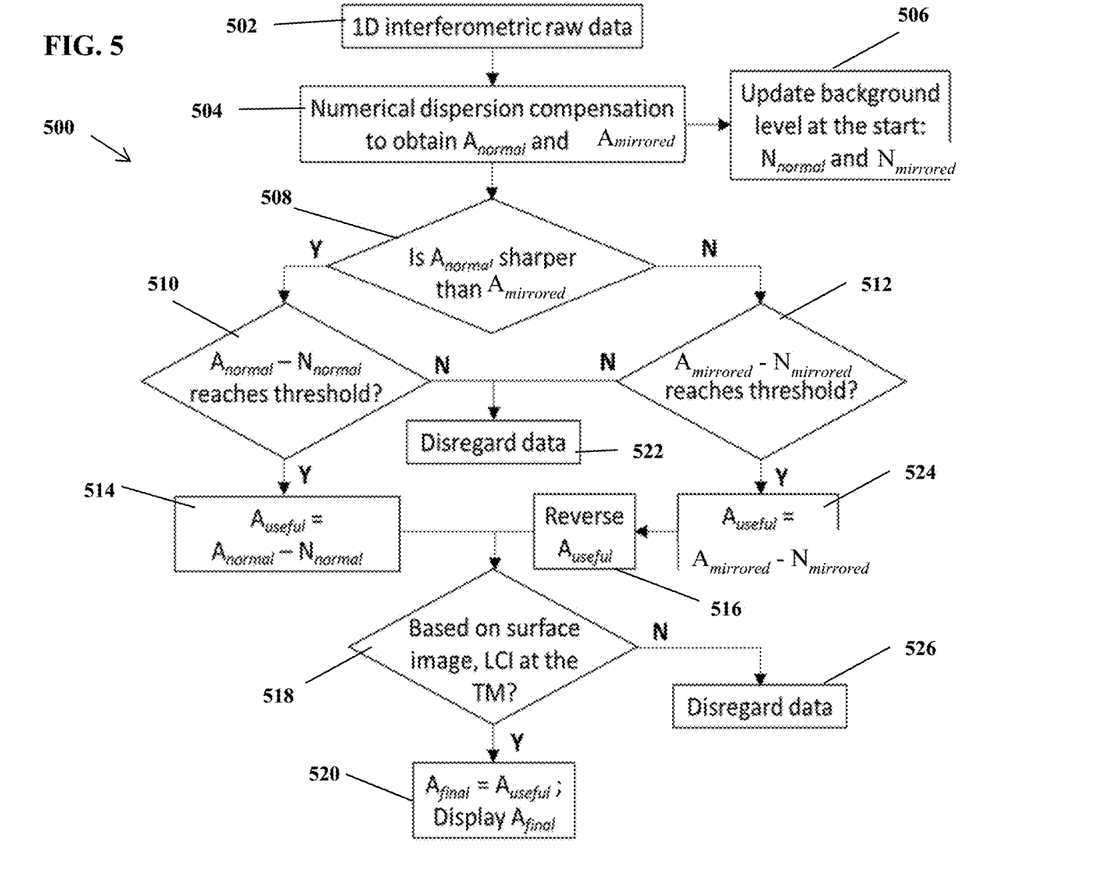
FIG. 5 is schematic flow chart showing the procedures of intelligent representation of low coherence interferometry (LCI) data.

The OCT based handheld imager method 500 comprises a specific handling of LCI data 502 to generate useful A-line profiles utilizing both normal and mirrored results, which effectively double the imaging range of LCI. As shown in FIG. 5, first, a background noise level is calculated to generate a flat background level for all the A-line results in the 1D interferometric data 502. To utilize both normal and mirrored signals, a numerical dispersion compensation 504 with different parameters is performed, which might lead to different background profiles. To correctly represent the background profile for both cases, two numerical dispersion compensations with different parameters are implemented to each raw interferometric data to generate two different A-line profiles, noted as $A_{normal}$ and $A_{mirrored}$. Due to the constant probe movement during an imaging session, each acquired raw interferometric data might be different from A-line to A-line caused by fiber twist, stretch, and the like. Hence to generate correct background profile, instead of averaging upon raw interferometric data, both $A_{normal}$ and $A_{mirrored}$ obtained from each raw interferometric data are averaged over all the current acquired data to obtain the noise background for normal and mirrored case 506, noted as $N_{normal}$ and $N_{mirrored}$ respectively. In this way, at the beginning of each imaging session, with a 100 fps camera, $N_{normal}$ and $N_{mirrored}$ will be the average over about hundreds of A-lines after several seconds. The number used for averaging includes a large number of A-lines, where the larger number is better; however the larger this number is, the longer time will be needed to acquire these number of A-lines. In one embodiment, averaging several hundreds of A-lines in several seconds is sufficient. In other embodiments, averaging at least a thousand A-lines in several seconds may suffice.

Second, the OCT based handheld imager method comprises subtracting $A_{signal}$ and $A_{mirrored}$ by $N_{signal}$ and $N_{mirrored}$ respectively and compared in terms of sharpness measurement 508, in order to determine whether the mirror image happens for the current acquired A-line. The one with overall higher sharpness is regarded as the correct A-line profile representation of the complex conjugate ambiguity.

The sharpness is one quantitative metric that can be evaluated. Different OCT images or A-lines will lead to quite different sharpness measure. In one embodiment to ensure the success of this method, the material with high group delay dispersion into either one of the two arms of the OCT system is added resulting in a large dispersion mismatch between the two arms. In one embodiment, the material with high group velocity dispersion is flint glass and in one embodiment the material is included only in the reference arm as the material in the sample arm may introduce unwanted attenuation. In other embodiments, the material with high group velocity dispersion is placed in the sample arm if optimal examples are more specific. In this way, the numerical dispersion compensation algorithm leads to more distinct A-line profile between $A_{signal}$ and $A_{mirrored}$. For example in the case that has a sharp peak where the $A_{mirrored}$ will have a broadened body of the peak with lower peak intensity. Sharpness is one quantitate metric of the A-line profile, which can also be evaluated in maximum intensity, and the like. Then, a threshold check is performed regarding whether there is sufficient SNR for example, in one embodiment the maximum signal is 10 dB higher than the noise level for this A-line profile. In other embodiments, the sufficient SNR is to at least 3 dB above the noise level. If it passes the SNR check 510, then this A-line profile is regarded as useful 514, noted as $A_{useful}$. In this case of mirrored image, $A_{useful}$ will be reversed 516 to keep display consistent with the normal LCI profile. If it does not pass the SNR check, then the A-line is disregarded. For display, there is no need to reverse back as all the mirrored images will be displayed in the same way (not consistent with normal LCI profile) such that user is not confused. For each $A_{useful}$, the corresponding surface image is then analyzed 518 to determine whether this A-line scan is performed at the position of interest, which is the TM, according to one embodiment. If the corresponding surface image is performed at the position of interest 520, then regard this $A_{useful}$ as the final A-line profile for analysis and note it as $A_{final}$. FIG. 5 illustrates the flowchart of these steps. If it does not passes the SNR check 512, then the data is disregarded 522 or $A_{useful}$ will be reversed 516 to keep display consistent with the normal LCI profile. For each $A_{useful}$, if the corresponding surface image is then analyzed 518 to determine whether this A-line scan is not performed at the position of interest, then the data is disregarded 526.

Figure 6:
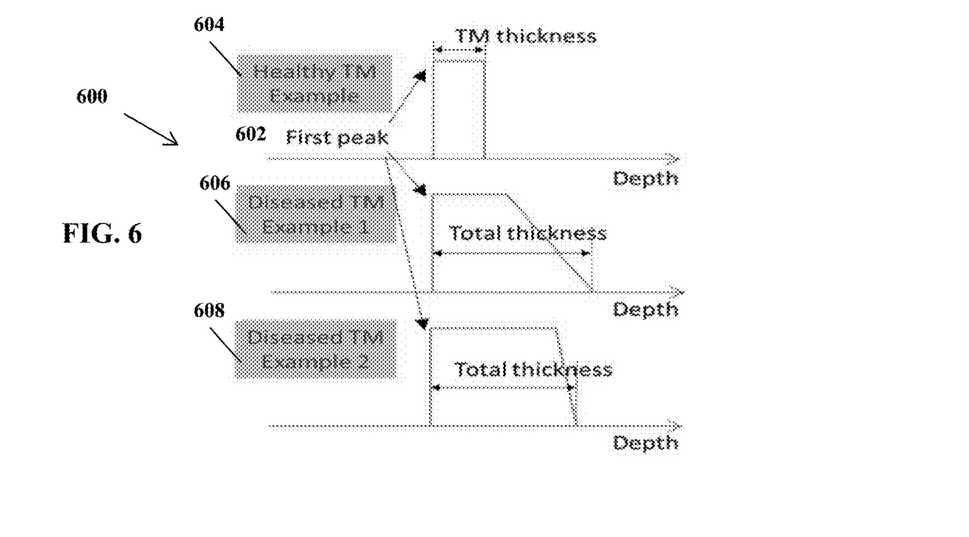
FIG. 6 is a graph showing the measure of total thickness in healthy and diseased cases.

As shown in FIG. 6, a specific analysis 600 is performed based on the useful A-line profile to provide better understandable results. After each $A_{final}$ is acquired, the first peak along the depth profile is identified 602, which is expected to be the signal of the TM surface according one embodiment. The signal intensity after this peak is fitted to a curve. As illustrated in FIG. 6, for a healthy TM 604, such curve would have a very steep slope when the signal drops to the noise level. In one embodiment, the steep slope is related to the axial resolution of the system and has an about 5-95% transition in the about 1-50 micron range. The thickness of human TM which is ~100 μm, Paritosh Pande, Ryan L. Shelton, Guillermo L. Monroy, Ryan M. Nolan and Stephen A. Boppart, "A Mosaicking Approach for In Vivo Thickness Mapping of the Human Tympanic Membrane Using Low Coherence Interferometry," *J Assoc Res Otolaryngol.* 17(5), 403-416, 2016, is also indicated by the curve. For diseased TM 606 however, due to the presence of pathological material behind the TM, this curve changes. One common feature of a diseased TM is that the total thickness indicated in FIG. 6 is larger 608 than the normal TM thickness. Hereby total thickness is defined as the distance between the first peak and the position where signal drops to noise level. As a screening tool in primary care office, the total thickness is utilized to evaluate the existence of pathological material behind TM. As one example, in practice since hundreds or even thousands of A-line profiles are evaluated, the result given to the clinicians could be the median of all the evaluated total thickness indicating the pathology of the TM. The distribution of total thicknesses can also be utilized to indicate the validity of measurement.

In summary, the method implements a low cost handheld imager system based on SD-OCT using a consumer grade camera for otoscopic imaging in primary care settings. Further these proposed solutions can be applied to other applications, both medical and non-medical. Along with two novelties, such a system has sufficient sensitivity and stability for such applications.

In summary, the Image based handheld imager system uses an area scan camera, which may be used in primary care settings for otoscopic imaging, or any imaging setting or configurations, such as for ophthalmoscope, dermatoscope, and the like. Compared with other reported SD-OCT systems, this Image based handheld imager system includes a relaxed alignment requirement without compromising image quality comprising using area scan camera with cylindrical lens and achieving similar SNR as traditional SDOCT; and a computer readable medium algorithm to further improve the robustness of alignment. The spectrometer design may be incorporated into other clinical imaging applications.

The computer readable medium algorithm facilitate intelligent representation of low coherence interferometry (LCI) data comprising effective doubling imaging depth utilizing both normal and mirrored results; and identifying width of scattering signal in depth to characterize physiological features.

The Image based handheld imager system uses an area scan camera together with the proposed processing method in the proposal leads to relaxed alignment requirements without compromising image quality. Additionally, lower cost is achieved, which assists towards adoption in primary care office.

The Image based handheld imager system is different from A-line profile, as it directly provides the interpretation of A-line profile and effectively doubles the imaging range by utilizing the both normal and mirrored signals. In some embodiments, A-line profile is used separately in some cases as needed, in addition to the automated interpretation.

Modifications

Alternative approaches to achieve tilt angle detection in the software correction. Besides the described methods for tilt angle detection based on identifying the highest LCI signals, the tilt angle can be directly detected from the fringe orientation on the image acquired from a highly reflective phantom. In order to obtain the fringes, instead of using a phantom at the sample arm as mentioned above, alternatively a transparent material with two surfaces such as a cover glass or a microscopic slide can be inserted in front of the camera 2D sensor as a common path configuration. The period of the fringe pattern is then determined by the thickness of the material. After the fringe is acquired, the tilt angle can be identified by tracking the orientations of the local maxima and minima for the same spectral frequency components on the image.

Alternative approaches to achieve misalignment correction in software hence further relaxing the alignment tolerance. After each image from the 2D sensor is acquired, a computational wavefront correction scheme can be implemented. In brief, the 2D image which is the fringe pattern from a highly reflective phantom is measured. To correct the wavefront, a Fourier transform is applied to the 2D image, and a phase filter is multiplied as the wavefront correction, which is then followed by an inverse Fourier transform. In order to search the correct phase filter, the correct fringe pattern from the same phantom is pre-determined using a well aligned spectrometer. Then a wavefront correction algorithm can be developed to search the best phase filter to best transform the captured fringe pattern into the correct fringe pattern.

Alternative approaches to provide better understandable results to facilitate intelligent representation of LCI data. Besides the measure of total thickness described above, an M-mode image can be provided. The M-mode image updates for each newly acquired A-scan for users to better track the current position. The image analysis can be performed on the M-mode image instead of each individual A-line.

The slope at where signals decrease to noise level at the medial side of the TM can be calculated as another feature to evaluate the existence of pathological material in the middle ear cavity. For normal healthy TM, since the absence of material behind TM, the LCI signal after TM quickly drops to noise level resulting in a very sharp slope. When a graduate change of the LCI signal hence smaller slope is observed, it indicates the existence of pathological materials such as biofilm or effusion as disclosed in Cac T. Nguyen et al., "Noninvasive in vivo optical detection of biofilm in the human middle ear," *Proc Natl Acad Sci* 109(24), 9529-34, 2012.

Figure 7:
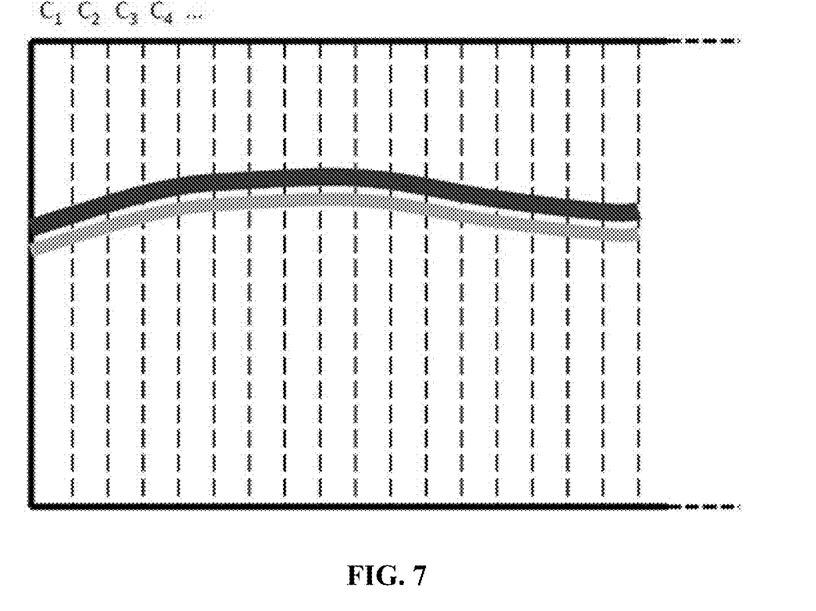
FIG. 7 is a schematic graph to display the M-mode image on 2D pixel array of a monitor screen, according to one embodiment.

As shown in FIG. 7, one embodiment in displaying the M-mode image on 2D pixel array of a monitor screen is shown. $C_1$, $C_2$, $C_3$ and on represent the plurality of pixel columns of the 2D array. Each pixel column can be used to display one A-scan by converting the signal level of each A-scan data point to the pixel brightness of the monitor screen. In one embodiment where the monitor screen that has multiple color (i.e. red, blue and green) channels, a color mapping can be used. As an illustrative but not limiting example, the red, blue and green channels have the same brightness for the same signal level, which generates a grayscale representation. When a newly acquired A-scan is to be displayed, all the pixel columns representing previously acquired A-scans are shifted. In one embodiment, the previously acquired A-scans are shifted to the right. The right-most or last pixel column in the previous 2D array is then removed. The newly acquired A-scan can be displayed in the left-most or first column, which is column C1 shown in FIG. 7. This method generates a scrolling display mode where the A-scan data continuously moving to the right. The A-scans are acquired periodically. The M-mode display update is updated at the same frequency as the A-scan acquisiting. To have a smooth viewing experience, the display update frequency, or frame rate is no less than about 10 Hz and preferably no less than about 25 Hz.

Figure 8:
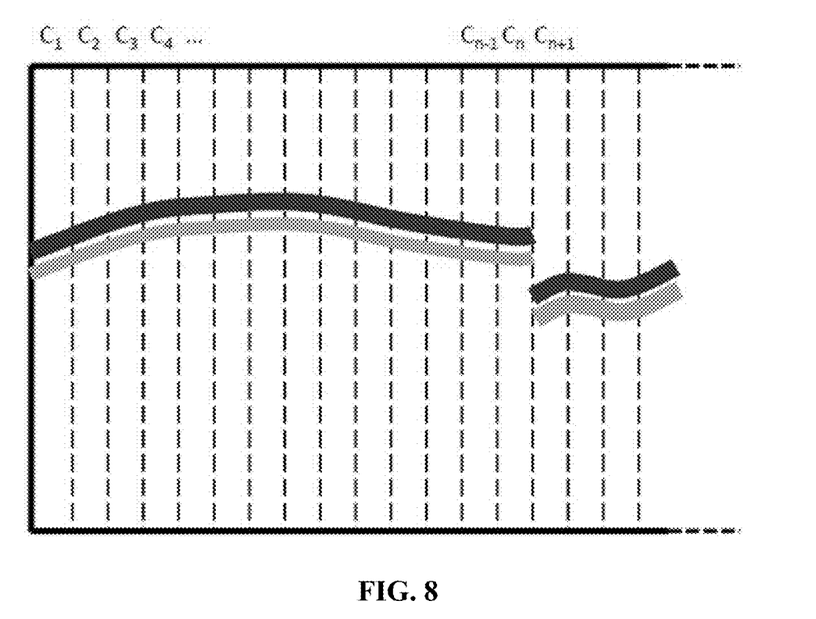
FIG. 8 is a schematic graph to display the M-mode image on 2D pixel array, according to one embodiment.

Sometimes it is difficult for the eyes to track a scrolling image, when a stationary image is preferred. FIG. 8 illustrates another embodiment to display the M-mode image on 2D pixel array. Instead of inserting the newly acquired A-scan to the left-most column, the new A-scan replaces the pixel column next to the last acquired A-scan while no other A-scans are shifted. As shown in FIG. 8, $C_{n-1}$ represents the last acquired A-scan, when the newly acquired A-scan arrives, the newly acquired A-scan replaces the data in column $C_n$. In one embodiment, there may be a discontinuation in appearance from column $C_n$ to $C_{n+1}$, because the data in column $C_{n+1}$ represents the A-scan acquired at some time in the past. In this display mode, the discontinuation appears to sweep to the right-most column and loop back to the left-most column. However, the A-scan data remains stationary before it is replaced by new data.

Computer Implemented Component or Systems

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, systems may include program modules, which may include routines, programs, components, data structures, etc. that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos. In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. An spectrometer comprising: a detection arm including a collimator, a grating, a cylindrical lens and a sensor to process a signal reflected from a sample to generate a signal of spectrum, wherein the signal of spectrum includes raw data and the raw data for each spectrum signal is a 2D image and a signal is processed after the 2D image is acquired to generate one 1D spectrum result, where the signal is processed by identifying a tilt angle due to alignment error regarding an average direction and correcting the tilt angle;
   detecting the correct tilt angle and rotating the 2D image according to the correct tilt angle;
   orienting the known reference spectrum perpendicular to the average direction if there is no tilt angle and no known reference spectrum washout occurs during averaging;
   computing the signal after processing a Fourier-transform;
   subtracting a background subtraction and obtaining a highest Signal-to-Noise (SNR), where:
     if the highest SNR is not obtained, then updating tilted angle, rotating image again, and then averaging along a vertical direction; and
     if the highest SNR is obtained, then performing a log display.

2. The spectrometer of claim 1, wherein the detecting of the tilt angle is only performed during an alignment process.

3. The spectrometer of claim 2, further comprising changing a direction of average operation to the tilt angle while not rotating the 2D image.

4. The spectrometer of claim 3, further comprising a fiber coupler operably coupled to the detection arm.

5. The spectrometer of claim 4, wherein the sensor is selected from the group consisting of a consumer grade area scan camera; a photodetector array, and a two-dimensional detector.

6. The spectrometer of claim 5, wherein the known reference spectrum is a fringe.

7. The spectrometer of claim 6, wherein the grating is at least 1/mm in order to reach a wavelength sampling.

8. The spectrometer of claim 7, further comprising a sample arm including a mirror at an appropriate depth such that a plurality of periodic fringe patterns are observed.

9. A method of facilitating representation of low coherence interferometry (LCI) data to increase an imaging range, comprising:
  calculating a background noise level to generate a flat background level for a plurality of A-line results in a 1D interferometric data;
  performing a numerical dispersion compensation with at least two different parameters to generate at least two different background profiles and at least two A-line profiles as $A_{normal}$ and $A_{mirrored}$; and
  averaging $A_{normal}$ and $A_{mirrored}$ obtained from each raw interferometric data over all a current acquired interferometric data to obtain the noise background for $A_{normal}$ and $A_{mirrored}$, as $N_{normal}$ and $N_{mirrored}$, respectively.

10. The method of claim 9, wherein each acquired raw interferometric data might be different from A-line to A-line caused by fiber twist or stretch.

11. The method of claim 10, wherein $N_{normal}$ and $N_{mirrored}$ is the average over at least one hundred A-lines after at least one second.

12. The method of claim 11, further comprising,
  subtracting an $A_{signal}$ and an $A_{mirrored}$ by a $N_{signal}$ and a $N_{mirrored}$ respectively, and comparing the results by a sharpness measurement to determine if a mirrored image occurred for a current A-line;
  obtaining the highest sharpness A-line as a correct A-line profile of a complex conjugate ambiguity;
  performing a threshold check to determine whether a sufficient Signal-to-Noise (SNR) for the maximum signal is at least about 3 dB higher than the noise level for the A-line profile;
  if the threshold check is passed, then the A-line profile is regarded as $A_{useful}$;
  if the threshold check is not passed in this case of mirror image, then the A-line is disregarded;
  analyzing a corresponding surface image for each $A_{useful}$ to determine whether an A-line scan is performed at a position of interest; and
  if the corresponding surface image is performed at the position of interest, then $A_{useful}$ is designated as a final A-line profile and noted as $A_{final}$.

13. The method of claim 12, wherein the LCI data is obtained with an interferometer including a material of high group delay dispersion into either one of a reference arm or a sample arm of an interferometric system to result in a large dispersion mismatch between the reference arm and the sample arm and creating a distinct A-line profile between $A_{signal}$ and $A_{mirrored}$.

14. The method of claim 13, wherein the distinct A-line profile includes a sharpness and an intensity profile.

15. The method of claim 14, further comprising performing a specific analysis on an useful A-line profile including:
  identifying a first peak along a depth profile after each $A_{final}$ is acquired, fitting a signal intensity after the first peak to a curve.

16. The method of claim 15, wherein the curve includes a steep slope when a signal drops to the noise level indicating a healthy tympanic membrane with a thickness about 100 µm.

17. The method of claim 16, further comprising detecting a diseased tympanic membrane by a total thickness that is larger than the healthy tympanic membrane, wherein the total thickness is defined as a distance between the first peak and a position where signal drops to a noise level.

18. The method of claim 16, further comprising utilizing a distribution of total thicknesses to indicate a validity of the measurement.

19. The method of claim 9, further comprising:
  a. displaying an M-mode image on a 2D pixel array including a plurality of pixel columns;
    i. displaying one A-scan on each pixel column by converting a signal level of each A-scan data point to a pixel brightness;
    ii. shifting previously acquired A-scans when a newly acquired A-scan is to be displayed;
    iii. removing the last pixel column in the 2D pixel array and displaying the newly acquired A-scan in the first column; or
  b. displaying an M-mode image on a 2D pixel array including a plurality of pixel columns;
    i. displaying one A-scan on each pixel column by converting a signal level of each A-scan data point to a pixel brightness;
    ii. replacing the pixel column next to the last acquired A-scan with a newly acquired A-scan, wherein the last acquired A-scan remains stationary before it is replaced with the newly acquired A-scan.

* * * * *